US006970590B2

(12) United States Patent
Harding

(10) Patent No.: US 6,970,590 B2
(45) Date of Patent: Nov. 29, 2005

(54) SIDE LIT, 3D EDGE LOCATION METHOD

(75) Inventor: Kevin George Harding, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 587 days.

(21) Appl. No.: 10/063,189

(22) Filed: Mar. 28, 2002

(65) Prior Publication Data
US 2003/0185433 A1 Oct. 2, 2003

(51) Int. Cl.$^7$ .................................... G06K 9/00
(52) U.S. Cl. ............... 382/152; 382/199; 382/154; 356/603; 73/104; 348/125
(58) Field of Search ................. 382/152, 154, 382/151, 199, 100; 356/69, 446, 600, 237.2, 356/603, 612; 73/104; 348/86, 92–93, 94, 348/125; 250/559.23, 559.22

(56) References Cited

U.S. PATENT DOCUMENTS

| | | | | |
|---|---|---|---|---|
| 4,297,034 A | * | 10/1981 | Ito et al. ................. 356/394 |
| 4,995,087 A | * | 2/1991 | Rathi et al. .............. 382/152 |
| 5,570,186 A | * | 10/1996 | Satzger et al. ........... 356/613 |
| 6,034,766 A | * | 3/2000 | Sugiura et al. .......... 356/239.1 |
| 6,072,898 A | * | 6/2000 | Beaty et al. ............. 382/146 |

* cited by examiner

Primary Examiner—Sanjiv Shah
Assistant Examiner—John Strege
(74) Attorney, Agent, or Firm—Fletcher Yoder

(57) ABSTRACT

Apparatus and a method for locating edges of a part for acceptance testing of the part. A white light source (12) illuminates the part which is mounted on a support (14) and rotated relative to the light source. Light reflected by the part creates an outline of the part along the edge thereof. The part is viewed by a camera (16) to obtain an image of the part including its edge. A processor (18) analyzes the image to locate the edge of the part in three dimensional space. Analysis of the image includes determining the number of pixels comprising the viewed image, at the edge thereof, as the part is rotated relative to the light source. The part has more than one edge, and each edge is located using the method. The locations of the edges of the part are now used in a co-ordinate system to locate other surface features of the part.

17 Claims, 1 Drawing Sheet

SIDE LIT, 3D EDGE LOCATION METHOD

BACKGROUND OF INVENTION

In non-contact measurement systems for measuring the physical characteristics of three dimensional (3D) objects such as turbine blades used in aircraft engines, one problem often encountered is accurately locating the edges of the object.

In acceptance testing of parts having a complex part shape such as, for example, a compressor blade, it is often not possible to obtain accurate information using conventional hard gauging techniques. Rather, a three dimensional (3D) surface measurement technique is employed using a structured light system. In such systems, the part under test is illuminated with a series of striped laser lines with surface feature information being mapped or registered into a coordinate system. The results are then compared with, for example, a CAD definition of the part to determine its acceptability.

In using this 3D measurement technique, one problem encountered is accurately locating the edges of the part. In this regard, it will be appreciated that the edges are not necessarily sharp edges, but rather are radiused; i.e., they have a rounded contour. Conventional 3D systems do not locate the edges of a radiused part well. If the location of an edge (or edges) cannot be precisely found, then the location of other surfaces features of the part in the co-ordinate system cannot be established with the necessary certainty to insure that accurate part data is obtained on which to accept or reject the part.

Heretofore, when 3D systems have been used for testing purposes, location of an edge has been attempting by doing a best fit of the data obtained from by the viewing system. While this approach is useful when edges are sharp, it is not effective when the edge is gently curved. An alternate approach has been to backlight the part and locate the edge through the resulting profile created when as part is turned on a pedestal or support. This method not only requires additional processing of the image data obtained by the viewing system, but the results obtained are not as accurate as those from the 3D method itself.

The method and apparatus of the present invention incorporate a diffuse (white) light source into a structured (laser) light system to obtain highly accurate edge location information so to provide more reliable part testing results.

SUMMARY OF INVENTION

Briefly stated, the method of the present invention is for locating edges of a part for acceptance testing of the part. A white light source illuminates the part which is mounted on a support for movement relative to the light source. Light reflected by the part creates an outline of the part along the edge thereof and the part is viewed with a structured laser light system which provides an image of the part including its edge. A processor analyzes the image to locate the edge. Analysis of the image includes determining the number of pixels comprising the viewed image, at the edge thereof, as the part is rotated relative to the light source. This analysis provides the location of the edge in space, in three dimensions, using triangulation techniques well known in the art. Usually the part has more than one edge, and each edge is located using this method. Once the location of the edges has been determined, their locations are now used in a co-ordinate system to locate other surface features of the part.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
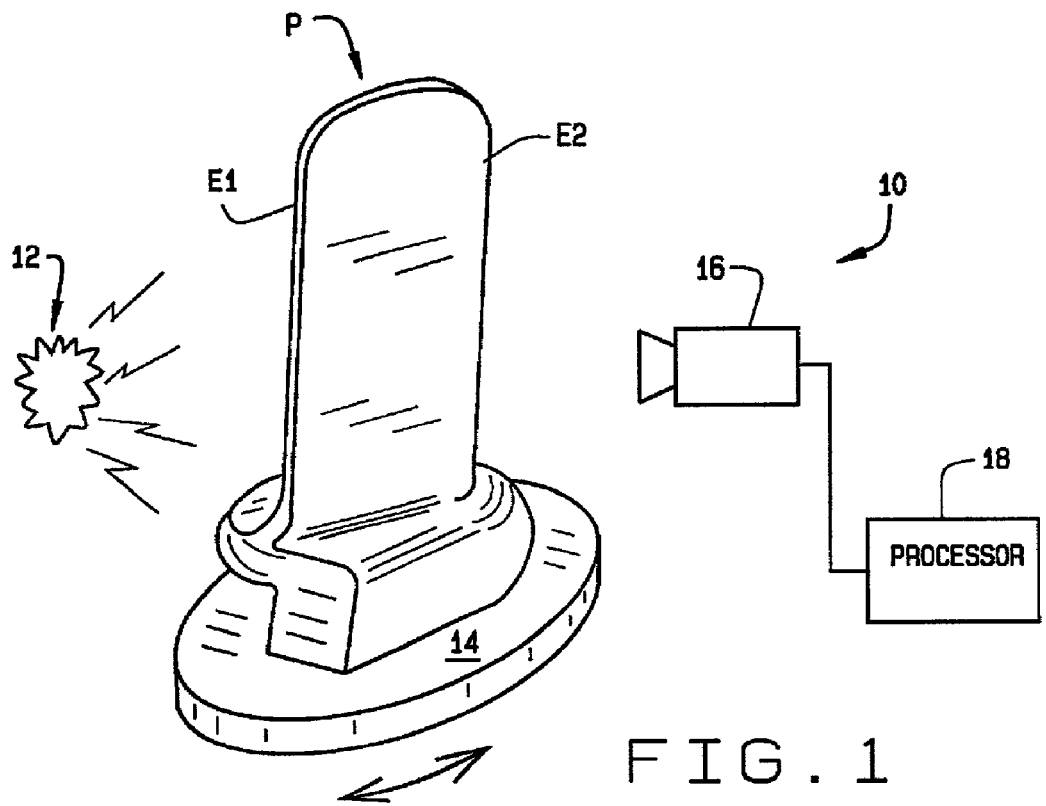
FIG. 1 is a simplified representation of apparatus of the present invention for use in accurately locating the edge of a part; and, FIG. 2 is a profile of the part as rotated or positioned so to present an outline of the part to present an edge thereof for viewing.

Referring to the drawings, a part P is, for example, a compressor blade. The part has complex part shape with the contours of the part not being readily measurable using hard gauging. In particular, the part has respective edges E1 and E2 which need to be accurately located. Apparatus of the present invention for doing so is indicated generally 10 in FIG. 1. Apparatus 10 first includes a white light source 12. The source is positioned so to illuminate the entire surface of the part. The part, in turn, is mounted on a support or pedestal 14 movable to rotate the part with respect to the light source. An imaging means 16 includes a camera or other imaging device to obtain images of the illuminated part. Images obtained from the light system are processed by a processor 18 which uses triangulation based methods to define the edge of the part using image data analyzed by the processor.

Figure 2:
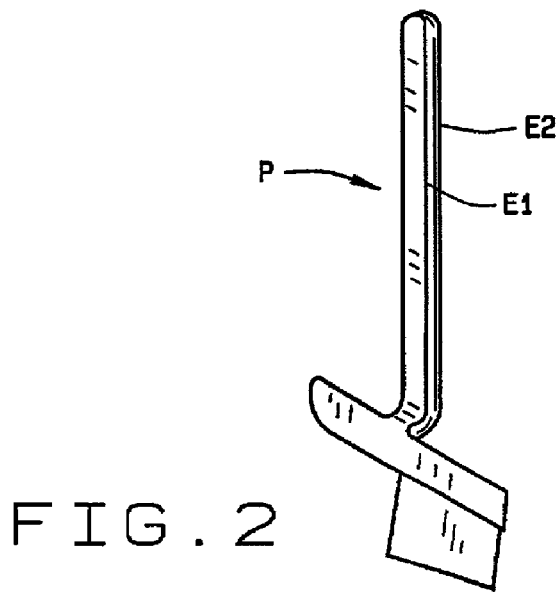

In practicing the method of the invention, white light source 12 is positioned to the side of the compressor blade. The positioning of the light source, or movement of the part on its support 14 is such as to create an outline of the part as shown in FIG. 2. Even though light system 16 is a structured light system typically used with laser light sources producing light stripes, an advantage of using source 12 is that the light is not directional. Since the edge E1, E2 of the part is a narrow, well defined surface, the white light striking the edge surface will light up the entire surface. If the part is properly positioned with respect to light source 12, light striking the edge will produce an observable specular reflection from the edge, without producing similar reflections from other surfaces on the part. If such a reflection is not seen, then the part, and/or the light source, is rotated apart a central axis of the part, until the reflection is observed.

When the edge of the part is appropriately located relative to the light source, a neat, clean line should appear at the location of the edge, whereas the surface of the part is not illuminated and so will appear dark. In analyzing the images by processor 18, the processor determines the number of pixels comprising the width of the line at the edge. By rotating the part so to view the edge in this manner from multiple locations, or by using multiple cameras to view the edge, the edge location is determined in three dimensional space. This type of processing is known in the art and is not described. It will be understood by those skilled in the art that other methods used in structured light systems to locate a line in three dimensions may also be used in this application without departing from the scope of the invention. Importantly, once the edge of the part is established, the position of the edge is referenced to a co-ordinate system by which surface features of the part are subsequently located during a light gauging procedure. Since part P has two edges E1 and E2, each edge is located in the manner above described and edge information for both edges is referenced to the co-ordinate system.

The important features of the method and apparatus of the invention are first that edges of a part are accurately located using 3D analysis of a structured light system. The use of a simple, diffuse white light source 12 adds capability to the 3D structured (laser) light system used to measure the surface features of the part. Second, edge locations are referenced into the same co-ordinate system as the location of the other surface features of the part. The edge locations provide boundaries by which the surface feature information can be compared to CAD data or other data by which acceptability of the part is determined.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for locating an edge (E1 or E2) of a part (P) for acceptance testing of the part using a structured light system comprising:

positioning a diffuse light source (12) in proximity of the part and illuminating the part with light radiating from the source;

rotating the part relative to the light source so light therefrom reflected by the part creates an outline of the part along the edge thereof;

viewing the part with an imaging means (16) to obtain an image of the edge of the part;

processing the image to locate the edge of the part in three dimensional space from data produced by analyzing the image; and using the location of the edge of the part in a co-ordinate system to locate other surface features of the part and compute surface feature information for the part, wherein computing the surface feature information for the part determines acceptability of the part.

2. The method of claim 1 wherein the light source (12) is a white light source.

3. The method of claim 2 wherein the imaging means (16) comprises a camera.

4. The method of claim 1 in which analyzing the image to determine the edge of the part includes determining the number of pixels comprising the reflected image viewed by the viewing means as the part is rotated relative to the light source.

5. The method of claim 4 in which analyzing the image includes determining the number of pixels at points along the edge of the part.

6. The method of claim 4 in which the part has more than one edge, and the method is used to locate each edge of the part.

7. A method for locating an edge (E1 or E2) of a part (P) for acceptance testing of the part comprising:

positioning a diffuse, white light source (12) in proximity of the part and illuminating the part with light radiating from the source;

rotating the part relative to the light source so light therefrom reflected by the part creates an outline of the part along the edge thereof;

viewing the part with an imaging means (16) to obtain an image of the edge of the part;

processing the image to locate the edge of the part in three dimensional space from data produced by analyzing the image; and using the location of the edge of the part in a co-ordinate system to locate other surface features of the part and compute surface feature information for the part, wherein computing the surface feature information for the part determines acceptability of the part.

8. The method of claim 7 using a structured laser light system (10).

9. The method of claim 7 in which analyzing the image to determine the edge of the part includes determining the number of pixels comprising the reflected image viewed by the viewing means, at the edge thereof, as the part is rotated relative to the light source.

10. The method of claim 9 in which the part has more than one edge, and the method is used to locate each edge of the part.

11. Apparatus (10) for locating an edge (E1 or E2) of a part (P) for acceptance testing of the part comprising:

a diffuse light source (12) positioned in proximity of the part and illuminating the part with a white light radiating from the source;

a support (14) on which the part is mounted, the support being rotatable to move the part relative to the light source so light from the light source reflected off the part creates an outline of the part along the edge thereof;

imaging means (16) viewing the part to obtain an image of the edge of the part; and a processor (18) processing the image to locate the edge of the part in three dimensional space from data produced by analyzing the image, wherein the processor uses the location of the edge of the part in a co-ordinate system to locate other surface features of the part and compute surface feature information for the part, wherein computing the surface feature information for the part determines acceptability of the part.

12. The apparatus of claim 11 in which the light source (12) is a source of white light.

13. The apparatus of claim 11 in which the processor (P) analyzes the image of the part to determine the edge of the part by determining the number of pixels comprising the reflected image at the edge thereof as the part is rotated relative to the light source.

14. The apparatus of claim 13 in which the part has more than one edge, and the apparatus locates each edge of the part as it is rotated relative to the light source.

15. In a structured laser light system for measuring surface features of a part (P), the improvement comprising:

a diffuse light source (12) positioned in proximity of the part and illuminating the part with a white light radiating from the source;

a support (14) on which the part is mounted, the support being rotatable to move the part relative to the light source so light from the light source reflected off the part creates an outline of the part along an edge (E1, E2) thereof;

a camera (16) viewing the part to obtain an image of the edge of the part; and a processor (18) processing the image to locate the edge of the part in three dimensional space from data produced by analyzing the image including determining the number of pixels comprising the reflected image at the edge thereof as the part is rotated relative to the light source, and the processor using the location of the edge of the part in a co-ordinate system to locate other surface features of the part and compute surface feature information for the part, wherein computing the surface feature information for the part determines acceptability of the part.

16. The improvement of claim 15 in which the part has more than one edge, and the system locates each edge of the part as it is rotated relative to the light source.

17. The improvement of claim 16 in which the light source (12) is a source of white light.

* * * * *